United States Patent [19]

Morey

[11] Patent Number: 4,459,022

[45] Date of Patent: Jul. 10, 1984

[54] FIBER OPTIC ANGULAR SENSOR

[75] Inventor: William W. Morey, West Hartford, Conn.

[73] Assignee: United Technologies Corporation, Hartford, Conn.

[21] Appl. No.: 473,495

[22] Filed: Mar. 9, 1983

Related U.S. Application Data

[63] Continuation of Ser. No. 197,713, Oct. 16, 1980, abandoned.

[51] Int. Cl.³ .................. G01B 11/26; G01V 9/04; G06M 7/00; G02B 5/14

[52] U.S. Cl. .................. 356/152; 250/221; 250/227

[58] Field of Search .................. 250/221, 227; 356/152

[56] References Cited

U.S. PATENT DOCUMENTS

| | | | |
|---|---|---|---|
| 3,182,291 | 5/1965 | Nassimbene | 178/18 |
| 3,395,287 | 7/1968 | Rajac | 250/221 |
| 3,432,671 | 3/1969 | Edmonds | 356/152 |
| 3,521,072 | 7/1970 | Wipson et al. | 250/221 |
| 3,811,047 | 5/1974 | Shragel | 250/211 K |
| 3,886,361 | 5/1975 | Wester | 250/221 |
| 4,201,443 | 5/1980 | Hodge | 250/227 |
| 4,210,029 | 7/1980 | Porter | 73/705 |
| 4,250,378 | 2/1981 | Mutton | 250/211 K |
| 4,260,187 | 4/1981 | Frosch et al. | 356/152 |

OTHER PUBLICATIONS

M. W. Carmichael, IBM Tech. Discl. Bulletin, vol. 19, No. 6, Nov. 1976, p. 2226, 340/365 P.

Primary Examiner—S. C. Buczinski
Attorney, Agent, or Firm—Eric W. Petraske

[57] ABSTRACT

A device for responding to the angular orientation of a control handle or other object comprises an electrically passive sensing head connected to a measurement device by an optical cable. In the sensing head, light is emitted from an optical fiber, reflected from a concave mirror mounted on the handle and intercepted by a plurality of optical fibers. The intensity of light intercepted by these fibers provides a measure of the tilt of the handle.

3 Claims, 7 Drawing Figures

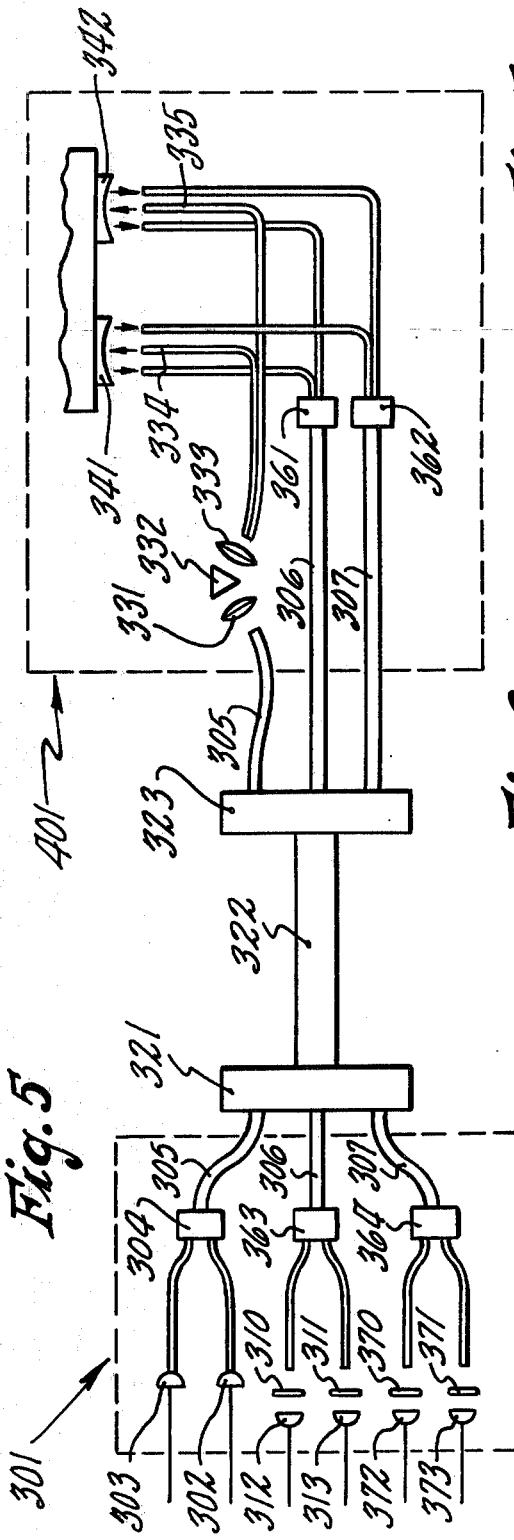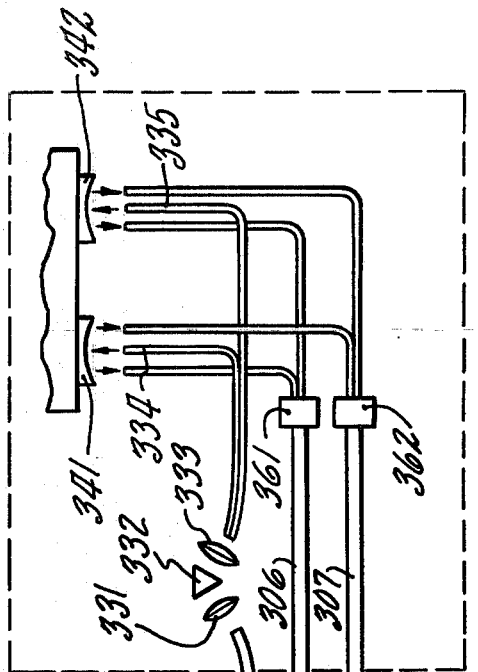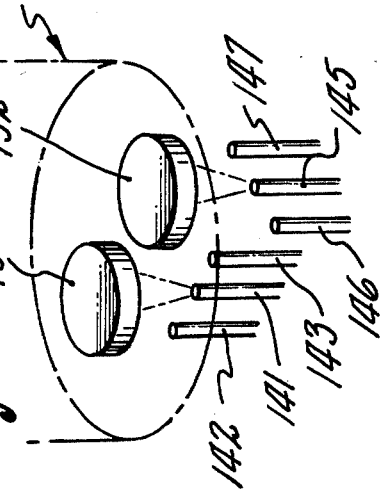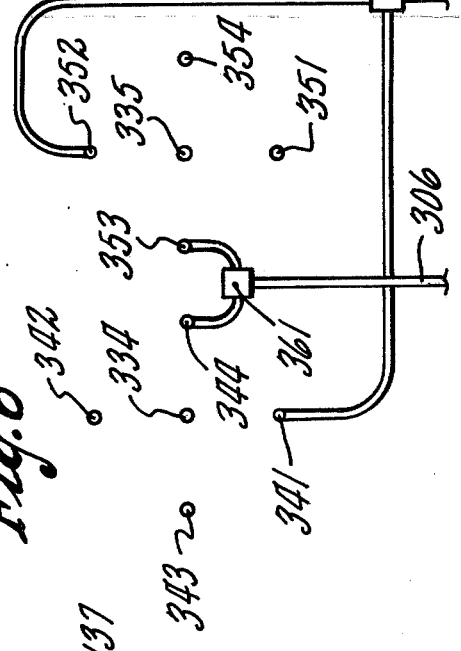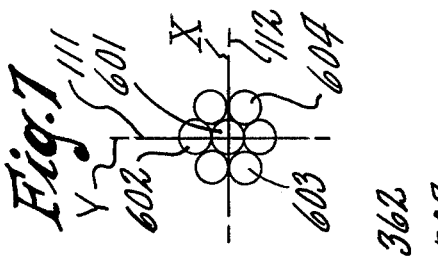

FIBER OPTIC ANGULAR SENSOR

CROSS REFERENCE TO RELATED APPLICATIONS

This is a continuation of application Ser. No. 197,713, filed Oct. 16, 1980, now abandoned.

DESCRIPTION

1. Technical Field

The technical field to which the invention relates is that of detecting angular orientation about two axes.

2. Background Art

U.S. Pat. No. 3,432,671 discloses an optical angular sensor involving the use of a planar cruciform detector in connection with a plane mirror and U.S. Pat. No. 3,277,304 discloses the use in a gyroscope of a frequency-dependent device having a pyramidal mirror and fiber optic bundles for transmission of light. U.S. Pat. No. 4,210,029 discloses a pressure sensor that makes use of a sensor for linear motion that employs an emitting optical fiber and receiving optical fibers.

DISCLOSURE OF INVENTION

The invention relates to an apparatus for detecting small changes in angle about two axes. The apparatus features the use of optical fibers as detecting elements in an electrically passive detecting head. A simple embodiment of the invention is suitable where the fiber-optic cable is permanently mounted and a more complex embodiment permits correction of the effect of removing and reinserting the optical cable.

BRIEF DESCRIPTION OF DRAWINGS

FIG. 4 shows an alternate arrangement of fibers and mirrors;

FIG. 5 shows an embodiment that permits the use of optical cable connectors;

FIG. 6 illustrates the fiber arrangement in the sensing head of the embodiment of FIG. 5; and FIG. 7 illustrates a hexagonal fiber array.

BEST MODE FOR CARRYING OUT THE INVENTION

Figure 1:
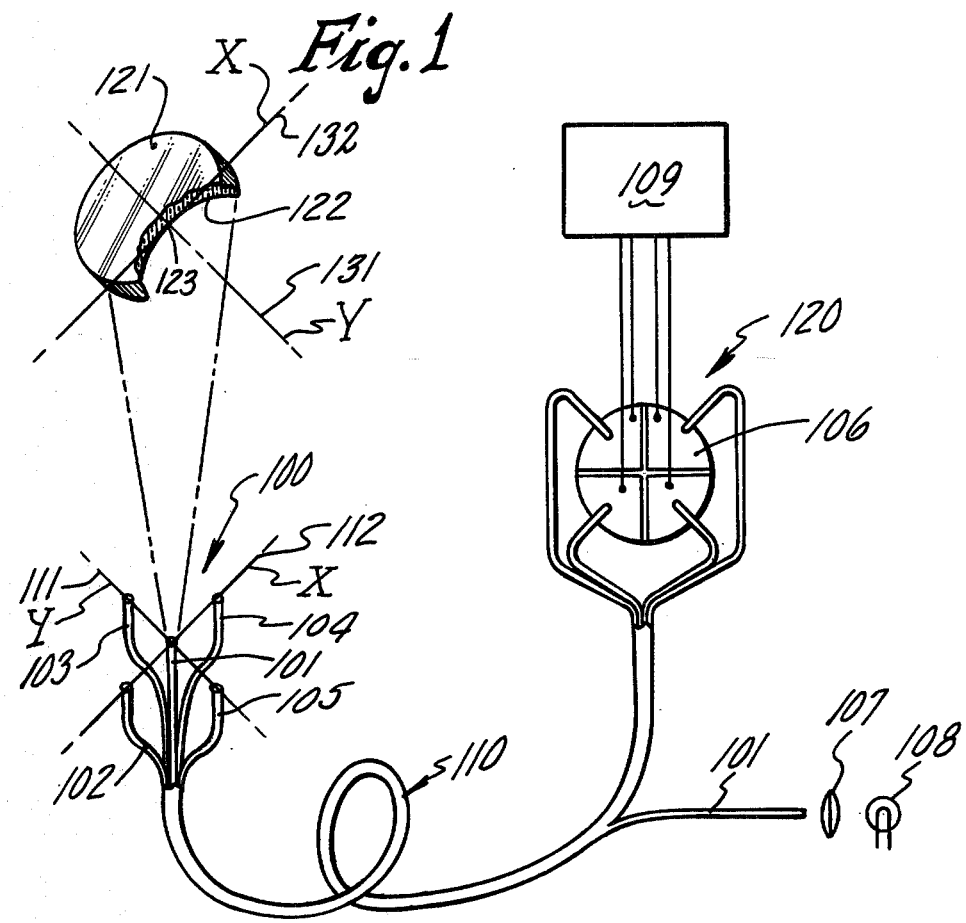
FIG. 1 shows an embodiment of the invention.

In FIG. 1, a simple embodiment of the invention comprises a concave mirror 121, mounted on an object, the orientation of which is to be measured, and positioned above a fiber optic cable end 100, which has a single light-emitting central fiber 101 and four receiving fibers; 102 and 104 disposed along the x axis 112 at equal intervals on either side of fiber 101 and receiving fibers 103 and 105 disposed similarly along the y axis 111. All five of the fibers form fiber optic cable 110 which carries light to and from a remote unit 120 which includes light source 108 and lens 107 for focusing input light into fiber 101 and quadrant optical detector 106, to which are attached receiving fibers 102-105 with the same relative orientation they have in the cable end. The electrical output of detector 106 is received by processing circuits 109, illustratively a microcomputer, which combine the detected signals to form an indication of the angular orientation of the object to be measured. Light detection is accomplished at cable end 100, in which light is emitted from fiber 101 having a cone-like distribution, the exact shape of which will depend on the modes in which light is transmitted along fiber 101 and the shape of its surface. This light strikes mirror 121, having a concave reflective surface 122, which serves to focus or image a pattern of light from fiber 101 and to direct it back toward the receiving fibers. In general, the light distribution in the vicinity of the receiving fibers will not be uniform, but will be a bell shaped pattern with circular lines of constant intensity in the x-y plane defined by axes 111 and 112. The prior art, in contrast, strove to produce a uniform illumination over relatively large detectors, as in the above-mentioned U.S. Pat. No. 3,432,671, so that there would be a linear relationship between the angle of tilt and the ratio or difference of signals from opposite detectors. For the purposes of the present invention, sensitivity is more important than linearity. The relationship between tilt and output signal may be made linear, of course, by the use of small angular displacements or by suitable choice of emitting fiber surface, collimating optics and spacing and curvature of mirror 121; or, equivalently, by calibration and electronic correction of the output signals in circuits 109.

The sensitivity of the device will be dependent on the spacing between mirror 121, its curvature and the distance between the emitting and receiving fibers. It is desirable to have a light intensity distribution (at rest) in the x-y plane that is circular in form having a radial dependence that is a monotonic function of radius, it doesn't matter whether increasing or decreasing, so that as mirror 121 is tilted, the initially equal signals in opposite fibers will change, with one signal increasing and the other decreasing. The more linear the monotonic radial dependence, the more linear the output, but in some cases, such as for control applications in which an x-y control stick or joystick is used to correct for deviations from a nominal value of some parameter, a light distribution that results in a nonlinear control signal that has a radial dependence that is greater than linear may be preferable, so that large deviations may be corrected quickly and smaller ones more gradually.

If the return beam intensity pattern is bell shaped (i.e. Gaussian), then the x and y displacements of the beam pattern, which is correlated with the control stick motion, can be detected separately as a ratio of the light intensities picked up at the receiving fibers 102, 103, 104, and 105. The ratio for the x and y motion is given by $$R_x = I_{104}/I_{102}, \quad R_y = I_{105}/I_{103}$$

where $I_{102}$, $I_{103}$, etc. are the beam pattern intensities at the corresponding receiving fibers.

The embodiment of the invention shown in FIG. 1 may be modified by the substitution of a seven-fiber cable having one emitting fiber and six receiving fibers in a hexagonal closest-packed configuration, the emitting fiber being in the center. Six detectors would then provide two sets of redundant signals with respect to three axes spaced 120° apart and an elementary coordinate transformation may be used to convert the three coordinate signals to orthogonal coordinates. In FIG. 7, emitting fiber 601 directs light toward a mirror and receiving fibers 602, 603 and 604, aligned with respect to x axis 112 and y axis 111 as shown, accept reflected light. Then $R_x = I_{603}/I_{604}$ and $R_y = I_{602}^2/(I_{603}I_{604})$. In the particular case of maintaining a planar surface at a particular orientation in space, three coordinates are natural and a coordinate shift would be unnecessary. These x and y displacements, represented by $R_x$ and $R_y$, also represent the angles of tilt and may be expressed in any convenient coordinate system, as is well known to those skilled in the art.

Figure 2:
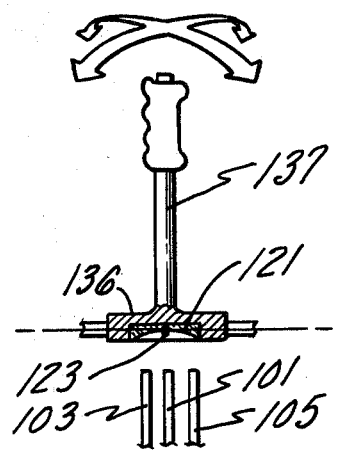
FIG. 2 shows in more detail the mounting of the object to be measured.

In FIG. 1, two axes 131 and 132 are drawn, parallel to 111 and 112 respectively, and intersecting at point 123, the center of mirror surface 122. If the object pivots about these axes, there will be no tilt in the motion but only rotation and the relation between signal output and tilt will be simple. An embodiment of the invention having this configuration is illustrated in FIG. 2, in which stick 137 is a joystick controlling some parameter of a system, such as a helicopter flight control, mirror 121 is attached to the bottom of stick 137 and mounting plate 136 is attached to stick 137. Conventional gymbals not shown support plate 136 so that it rotates about point 123, the center of mirror 121.

Figure 3:
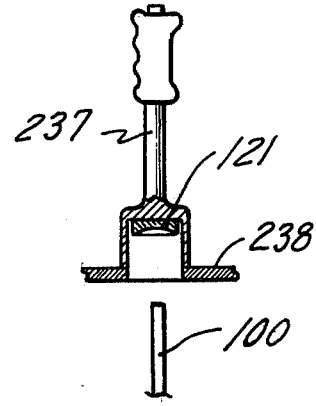
FIG. 3 shows an alternate mounting method.

An alternative embodiment of this invention is shown in FIG. 3, in which joystick 237 is mounted on fixed plate 238. Mirror 121 is fastened to the hollow interior of stick 237 so that it not only tilts as stick 237 is flexed, but it is also translated away from the axis of fiber head 100. Such a mounting will be less expensive to fabricate than the former embodiment.

An alternative approach to mounting the fibers is illustrated in FIG. 4, in which two linear arrays of three fibers each respond to rotations about the two axes. Emitting fiber 141 directs light toward mirror 151 which returns it to fibers 142 and 143. Similarly, emitting fiber 145 reflects light off mirror 152 to fibers 146 and 147. These two arrays would be mounted at right angles to one another for convenience in handling the output signals. The complexity of mounting two mirrors may, in some cases, be compensated by the simplicity of mounting the sets of three fibers in a single line. Of course, where only a single axis is of interest, only a single three-fiber array need be used.

Illustratively, a set of three multimode fibers having core diameters of 62 μm, cladding diameters of 125 μm and numerical apertures of 0.14 were used to reflect light from a 12 cm radius of curvature mirror. Angular displacement of 0.7 mrad gave a full change in intensity from one fiber to the next. A detection change sensitivity of 0.1% in the amplitude measurement circuits provides an angular resolution of 0.7 μrad. An 8.6 mm radius of curvature mirror provided angular sensitivity of 4.7 μrad. For the embodiment of FIG. 3, a seven inch long stick displaced at the top by ⅛ inch provides an angular displacement of 5 to 15 mrad at about one inch from the base, an amount well within the capability of the sensor.

The embodiment of FIG. 1 employed a single continuous fiber optic cable. Fiber optic connectors are well known, but suffer from the drawback that uncoupling and recoupling a connector will change the attenuation of the separate fibers by different amounts. FIG. 5 illustrates an embodiment of the invention that permits the use of connectors, in which electronics package 301 contains light sources and detectors for two frequencies $\lambda_1$ and $\lambda_2$, and fiber optic connectors 321 and 323 couple fiber optic cable 322 between package 301 and sensing package 401. In operation, light sources 302 and 303 generate light at wavelengths, $\lambda_1$ and $\lambda_2$, respectively, which light is combined in coupler 304, well known in the art, and injected into fiber 305, which carries it through connector 321, along cable 322 through connector 323, collimating lens 331, prism 332 and focusing lens 333, which couples light of $\lambda_1$ into fiber 334 and $\lambda_2$ into fiber 335. The light from emitting fibers 334 and 335 reflects off mirrors 341 and 342, mounted symmetrically about the axis of joystick 343, and into fibers disposed about emitting fibers 334 and 335 as before.

FIG. 6 shows a partially schematic plan view of the fiber arrangement of FIG. 5, in which emitting fiber 334 is surrounded by fibers 341, 342, 343, 344 and emitting fiber 335 is surrounded by fibers 351, 352, 353, 354. Fibers 344 and 353 are joined in coupler 361, which combines light from two frequencies into fiber 306. Similarly fibers 341 and 352 are combined in coupler 362, which combines light from both frequencies into fiber 307. Note that cables 306 and 307 each contain information at two wavelengths from fibers located in opposite sides of the emitting fibers.

In unit 301, light from fiber 306 is split in coupler 363, then filtered in band-pass filter 310, which passes $\lambda_1$ and band-pass filter 311, which passes $\lambda_2$. The filtered light is then detected in detectors 312 and 313 which produce signals $I_{344}(\lambda_1)$ and $I_{353}(\lambda_2)$, respectively. Light from fiber 307 is split in coupler 364, passes through filters 370 and 371 into detectors 372 and 373 in a similar fashion, resulting in signals $I_{341}(\lambda_1)$ and $I_{352}(\lambda_2)$. These signals may be combined to form output X and Y signals, $R_x$ and $R_y$, by taking the ratio $$R_x = I_{353}(\lambda_2)/I_{344}(\lambda_1), R_y = I_{352}(\lambda_2)/I_{341}(\lambda_1)$$

These are monotonic functions of angle that have the valuable property that they are independent of light intensity in different cables and thus unaffected by the amplitude shifts that will result when connectors 321 and 323 are made and unmade. The unused fibers 342, 343, 351, 354 in FIG. 5 may be combined to form a redundant signal, used for greater reliability.

The existence of the extra information in this embodiment permits the computation of a third parameter of the object's orientation, i.e. the twist about the joystick axis, so that a single control may be used for the control of an additional parameter of the system. In that case, the signals from fibers 342 and 352, or 344 and 354, etc. from a parameter representing the twist of the joystick and having the form $$R_\theta = I_{342}(\lambda_1)/I_{352}(\lambda_2)$$

It is not necessary, for many applications, that the angular orientation of the joystick or handle be computed. When an embodiment of the invention is used to control some device - a stepping motor, means for varying voltage or any other controlling device, the separate measured intensity values may be more convenient than the angle.

Although the invention has been shown and described with respect to exemplary embodiments thereof, it should be understood by those skilled in the art that the foregoing and various other changes, omissions and additions may be made therein and thereto, without departing from the spirit and the scope of the invention.

I claim:

1. An apparatus for generating at least one controlling signal in response to angular manipulation comprising:
    a handle capable of being flexed about at least one axis;

a concave mirror fixedly mounted on said hangle with a predetermined orientation with respect thereto, whereby said mirror is tilted and displaced by flexing of said handle;

at least one emitting optical fiber having an emitting end for directing light toward said mirror;

a plurality of receiving optical fibers for receiving light emitted from said emitting end and reflected from said mirror, which receiving fibers have receiving ends disposed in predetermined receiving positions about said emitting end;

means for directing light along said emitting fiber toward said emitting end; and means for measuring the intensity of light received by said receiving fibers to form a plurality of controlling signals representative of the degree of tilt of said handle about said at least one axis.

2. An apparatus according to claim 1, in which four receiving fibers are mounted with their receiving ends parallel to said emitting end and disposed about said emitting end along a pair of predetermined axes.

3. An apparatus according to claim 2, in which said axes are orthogonal, said receiving ends are positioned on opposite sides of said emitting fiber and separated from said emitting fiber by a uniform distance and four of said measured intensity values are combined to form at least two controlling signals.

* * * * *